United States Patent [19]
Takahashi et al.

[11] Patent Number: 5,903,136
[45] Date of Patent: May 11, 1999

[54] METHOD FOR CHARGING SECONDARY BATTERIES

[75] Inventors: Tadashi Takahashi, Hitachi; Satoru Funaki, Yokohama; Hideki Miyazaki, Hitachi; Katsunori Nishimura, Hitacioota; Yoshiaki Kumashiro, Hitachi; Akihiro Takanuma, Shimotsuga-gun, all of Japan

[73] Assignee: Hitachi, Ltd., Tokyo, Japan

[21] Appl. No.: 08/975,668

[22] Filed: Nov. 28, 1997

[51] Int. Cl.$^6$ ..................................... H01M 10/44
[52] U.S. Cl. ............................. 320/128; 320/164
[58] Field of Search ..................... 320/125, 128, 320/132, 137, 148, 149, 161, 162, 163, 164, FOR 118, FOR 119, FOR 138, FOR 144, FOR 150

[56] References Cited

U.S. PATENT DOCUMENTS 4,246,529  1/1981  Jurgens et al. ........................... 320/139
5,160,880  11/1992  Palanisamy ........................ 320/162 X

FOREIGN PATENT DOCUMENTS 7-240235  12/1995  Japan .

*Primary Examiner*—Edward H. Tso
*Attorney, Agent, or Firm*—Antonelli, Terry, Stout & Kraus, LLP

[57] ABSTRACT

During the charging of a secondary battery, the charging current is maintained, but the value of the current is changed for a short time, and the internal resistance of the battery is calculated from the voltage and the current before and after the changing of the charging current. The charging voltage is determined by adding an extra voltage equivalent to the voltage drop caused by the internal resistance to a designated voltage. Thus, it takes only a short time for stabilizing the voltage when the current is changed, because the charging current is not switched off completely. Therefore, the charging time can be shortened.

13 Claims, 7 Drawing Sheets

$V1 = E + (R1+R2+R3+R4)\ i \quad \cdots (1)$
$V3 = E + (R1+R2+R3+R4)\ i/2 \quad \cdots (2)$
$V1-V3 = (R1+R2+R3+R4)\ i/2 \quad \cdots (3)$
$(R1+R2+R3+R4) = 2(V1-V3)/i \quad \cdots (4)$
$V5 = E + (R1+R2+R3+R4)\ i \quad \cdots (5)$
$V5-V3 = (R1+R2+R3+R4)\ i/2 \quad \cdots (6)$
$(R1+R2+R3+R4) = 2(V5-V3)/i \quad \cdots (7)$

METHOD FOR CHARGING SECONDARY BATTERIES

BACKGROUND OF THE INVENTION

The present invention relates to a method for charging secondary batteries, in particular, to decrease the charging time.

Since secondary batteries such as a lithium ion battery, have various advantages, such as a large capacity and so on, secondary batteries have been put to practical use in various fields. On the other hand, secondary batteries also have disadvantages, such as a small tolerance against overcharge and over-discharge, and a narrow usable voltage range. In view of this, a method of controlling the applied voltage for charging the batteries, in consideration of a voltage drop caused by the internal resistance of the batteries, has been effective. An example of this method has been disclosed in JP-A-7-240235 (1995). In accordance with the disclosed method, the charging current is switched off during the charging of a battery, the internal resistance of the battery is calculated based on values of the voltages before and after the switching off, and the voltage applied to the battery is maintained at a designated value by charging the battery with a charging voltage, to which is added an extra voltage equal to the voltage drop caused by the internal resistance of the battery.

Figure 10:
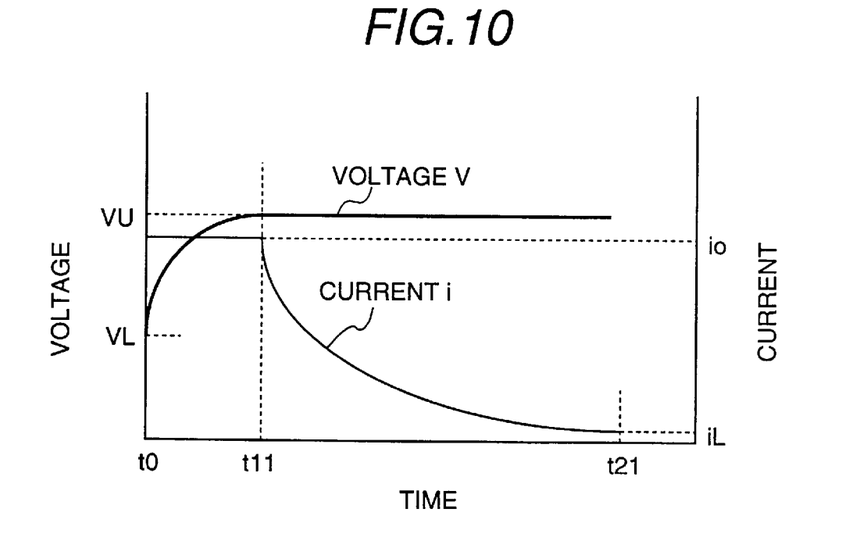
FIG. 10 is a graph indicating the voltage and the current during the charging of secondary battery using a conventional method.

A relationship between the charging voltage and the charging current at the time of charging a battery, when the battery is conventionally charged with a constant designated voltage without considering the internal resistance of the battery, is shown in FIG. 10. During the initial period, charging is performed with a constant current so as not to allow the charging current to exceed a designated value, because the voltage of the battery is low. After the voltage of the battery is increased to reach VU, the charging is performed with a constant voltage.

Figure 11:
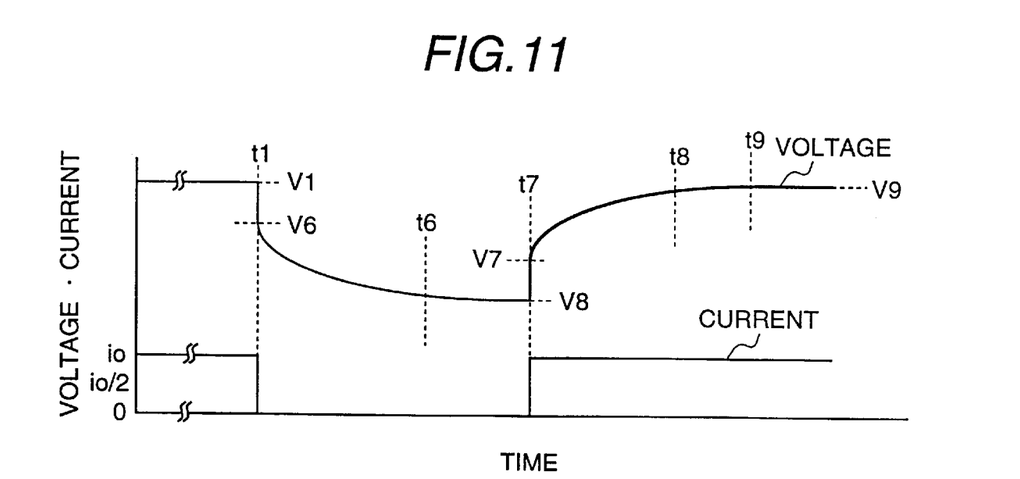
FIG. 11 is a graph indicating a method for measuring the internal resistance of a secondary battery in accordance with a conventional method.

Then, the internal resistance of the battery during the charging is determined. An example of conventional methods for determining the internal resistance, wherein the internal resistance of the battery is determined by switching off the charging current completely during the charging of the battery, is indicated in FIG. 11. FIG. 11 shows that it takes a long time to stabilize the terminal voltage of the battery at a constant value after switching off the current. FIG. 11 also shows that it takes a long time to stabilize the voltage at a constant value after switching on the current.

In accordance with the above-described conventional method, the following problems are generated, because the charging current is switched off completely during the charging of the battery.

(1) It takes a long time to stabilize the voltage at a constant value after switching off the current.

(2) Accordingly, an effect of decreasing the charging time is not significant, because the charging is stopped for a long time during the charging operation.

SUMMARY OF THE INVENTION

In order to solve the above problems, the present invention provides a novel method for charging secondary battery, wherein the charging current is varied for a short time without switching off the charging current during the charging operation, and the internal resistance of the battery is calculated based on the voltage and the current before and after the variation of the charging current. The charging voltage is determined by adding an extra voltage equivalent to the voltage drop caused by the internal resistance of the battery measured by the above-described method to the battery voltage which is determined by the kind of the secondary battery.

In accordance with the present invention, only a short time is required to stabilize the voltage at a constant value when the charging voltage is varied, because the charging current is not switched off completely, and the time for varying the charging current can be decreased. The charging time can be decreased further, because the charging current is not switched off completely.

BRIEF DESCRIPTION OF THE DRAWINGS

These and other objects, features and advantages of the present invention will be understood more clearly from the following detailed description when considered with reference to the accompanying drawings, wherein:

FIG. 3(*a*) is a graph and FIG. 3(*b*) is a chart of a set of computer program relationships indicating a method of measuring the internal resistance of a secondary battery for use with the method for charging a secondary battery according to the present invention;

DESCRIPTION OF THE PREFERRED EMBODIMENTS

Hereinafter, an embodiment of the present invention will be explained with reference of FIG. 1 to FIG. 9.

Figure 1:
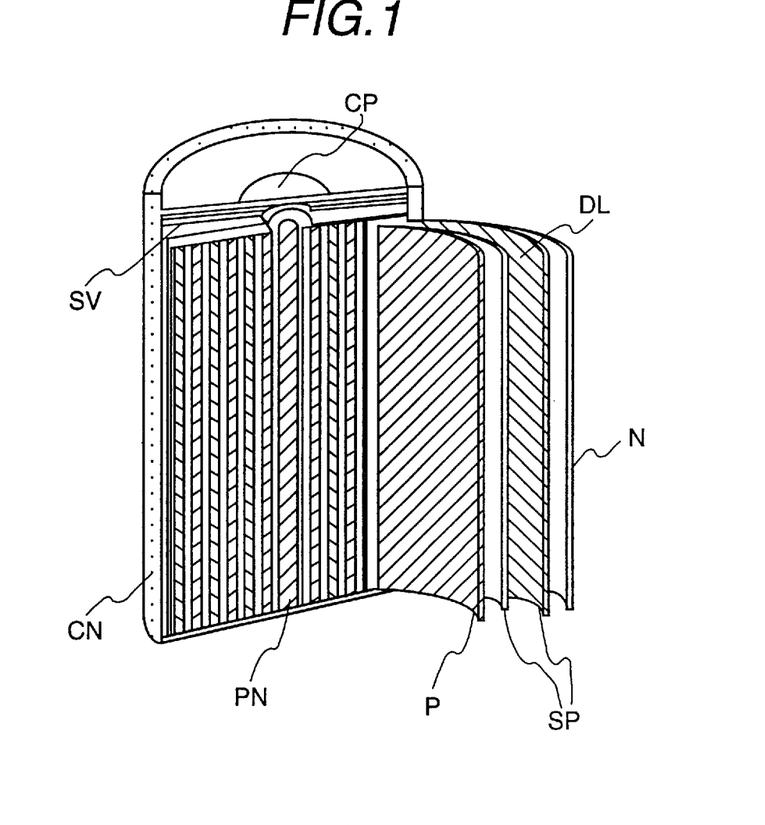
FIG. 1 is a diagrammatic vertical sectional view of a structure representing an example of a secondary battery, which is chargeable by the method of the present invention.

FIG. 1 is a diagrammatic vertical sectional view of the structure of a lithium ion secondary battery, representing an example of a secondary battery which is chargeable by the method of the present invention. The lithium ion secondary battery has a structure, wherein an electrolytic solution or an electrolyte DL is sandwiched between a positive pole P and a negative pole N via a separator SP, and the sandwiched members are wound in a roll. The center pin PN is connected to the positive pole cap CP. The negative pole can CN is connected to the negative pole N. A safety valve SV is provided, which will release the internal pressure of the battery when it is increased excessively.

Figure 2:
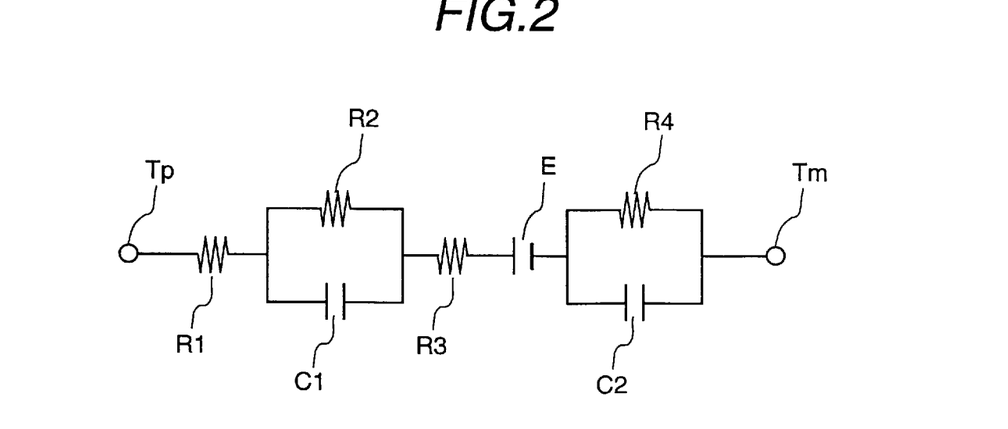
FIG. 2 is an equivalent circuit diagram of the secondary battery shown in FIG. 1.

FIG. 2 is an equivalent circuit diagram of the secondary battery shown in FIG. 1. The terminal Tp is a positive terminal of the battery, and the terminal Tn is a negative terminal of the battery. The resistance R1 represents the internal wiring resistance of the battery, and the resistance R3 simulates the resistance of the electrolytic solution or the electrolyte DL of the battery. The battery symbol E indicates the internal voltage of the battery; the resistance R2 and the static capacitance C1 indicate characteristics of the positive pole; and the resistance R4 and the static capacitance C2 indicate characteristics of the negative pole. When charging a battery, the charging is performed with a constant current and a constant voltage. Accordingly, the charging can be thought of almost as a direct current operation. The static capacitances C1 and C2 can be neglected, except in the case of a rapid change in the current and voltage. Therefore, the internal resistance of the battery can be thought of as a series circuit formed of the resistances R1 to R4. Since the values of R3 and R4 are significantly small in comparison with the values of R1 and R2, the internal resistance of the battery can be represented sometimes by the resistances of R1 and R2.

Figure 3A:
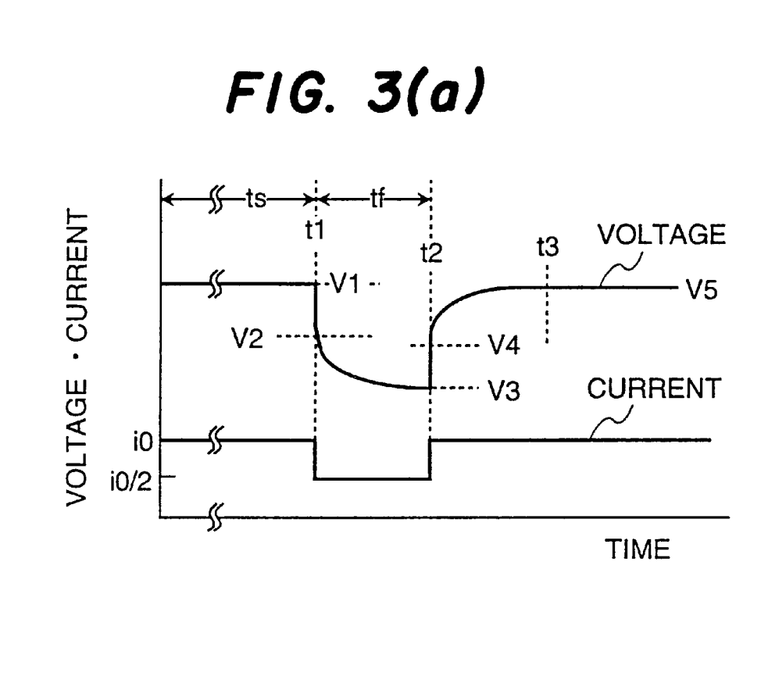
Figure 3B:
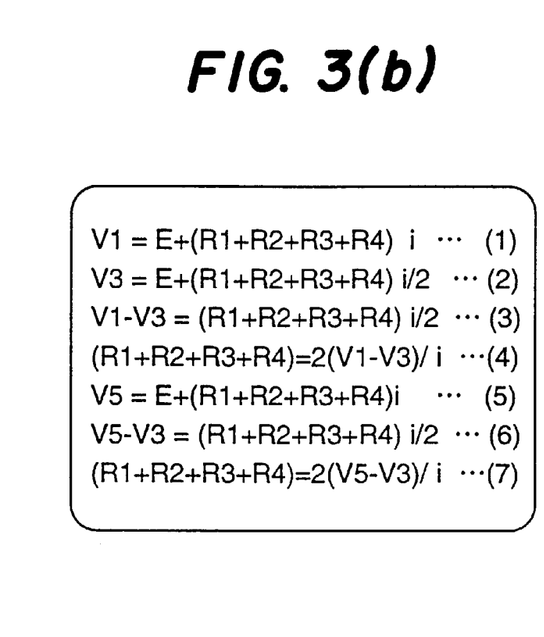

FIG. 3($a$) is a graph and FIG. 3($b$) is a chart of a set of computer program relationships for a method for measuring the internal resistance of a secondary battery in accordance with the method of the present invention. The graph indicates changes in the current and voltage during a short time of the charging operation with a constant current. The abscissa indicates the time, and the ordinate indicates the terminal voltage of the secondary battery and the current flowing through the secondary battery. The battery is charged with a normal current i0 during an initial period, and the current is reduced to i0/2 (a half of the normal current i0) during a short time tf after a time ts has elapsed from the start of the operation. Here, the normal current i0 is controlled so as to be the maximum current im, as will be explained later with reference to FIG. 7–FIG. 9. At that time, the voltage is changed, as shown in FIG. 3, and is stabilized at a constant value of V3 after elapse of a certain time. The instantaneous drop of the initial voltage from V1 to V2 is caused by the voltage drop of the resistance of R1 and R3. Then, the voltage varies depending on the capacitance component in the equivalent circuit shown in FIG. 2, and finally is stabilized at a definite value V3. The instantaneous increase in the voltage to V4 when the current is again raised to i0 is influenced by the voltage drop of the resistance of R1 and R3. The voltage is gradually stabilized at a value V5. On account of the change described above, the voltages V1, V3, and V5 can be expressed by the equations (1), (2), and (5) shown in FIG. 3($b$). The internal resistance of the battery can be calculated by the equation (4) or the equation (7) based on the voltage V1 before varying the current, and the stable voltage V3 after varying the current. Then, the battery is charged with a voltage which is obtained by adding a correcting voltage, which is calculated as a product of the internal resistance (R1+R2+R3+R4) obtained by the equation (4) or the equation (7) and the current, to a predetermined internal voltage of the battery. The predetermined internal voltage is designated as a sum of an electromotive force determined by the structure of the battery and a margin for ensuring reliability. For instance, the predetermined internal voltage of a Li battery becomes approximately 4.2 V.

The internal resistance of R1 and R3 of the battery can be determined by reading the voltage V2 at a moment when the current is reduced from i0 to i 0/2 (a half of the normal current) for a short time tf and the voltage V1 before reducing the current from the following equation:

$$R1+R3=2(V1-V2)/I$$

When the resistance of R1 and R3 is large in comparison with the resistance of R2 and R4, the internal resistance can be represented by R1+R3.

In the present embodiment, although the internal resistance was measured by reducing the current from i0 to i0/2 (a half of the normal current), the same effect can be obtained by varying the current to a value other than i0/2. The current can be increased from i0 to 15×i0 (1.5 times of the normal current) for a moment. In this case, the charging time can be decreased further. Since the resistance can be calculated from the voltage V1 and V3, so that V5 does not necessarily have to be measured. Otherwise, the resistance can be calculated from the V3 and V5, and V1 does not necessarily have to be measured. If an average value of the resistance calculated from the voltage V1 and the voltage V3 and the resistance calculated from the voltage V5 and the voltage V3 is used, the preciseness of the calculated resistance is improved significantly.

The time ts for measuring the internal resistance of the battery for more than one minute can be thought of as sufficient in consideration of the temperature change and other characteristics of the battery, and less than 30 minutes is desirable in consideration of reducing the charging time of the battery and the temperature time constant. When the size of the battery is small, less than 10 minutes is preferable. Furthermore, the current varying time tf is desirably at least 10 ms in consideration of the measuring time, and is equal to or less then one minute in consideration of the objective of shortening the charging time.

When the internal resistance is measured by decreasing the current, an increase in the charging time will scarcely produce any problem in comparison with the case when the charging is performed throughout with the normal current i0 if the decrease of the current is more than 0.5 times that of the normal current i0. In this case, the time when the current is decreased is desirably equal to or less than one minute.

When the internal resistance is measured by increasing the current, deterioration of the secondary battery by increase of the current hardly becomes a problem if the increase of the current is equal to or less than 1.5 times that of the normal current i0, and the time when the charging current is increased is desirably equal to or more than 10 ms and equal to or less than one minute.

Figure 4:
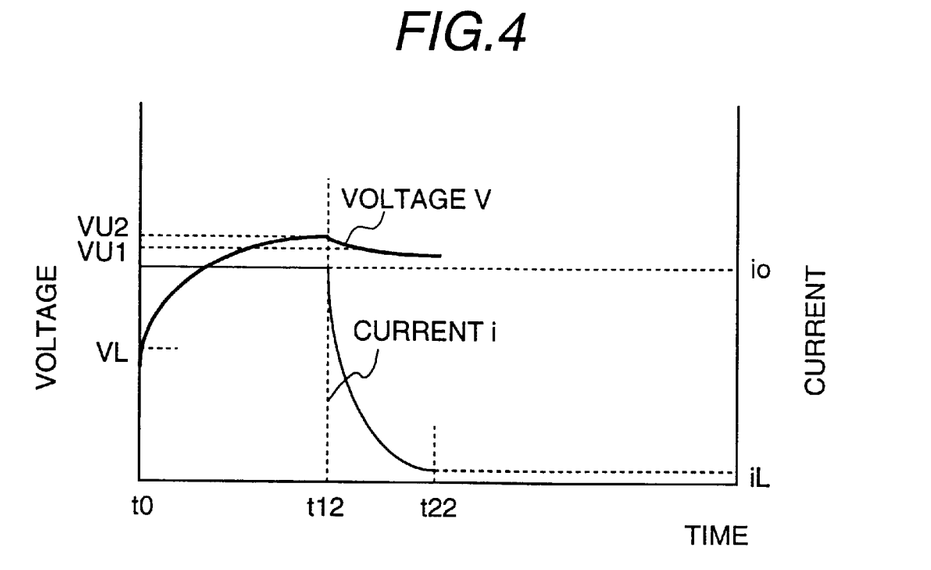
FIG. 4 is a graph indicating the voltage and the current during the charging of a secondary battery by the method of the present invention.
Figure 5:
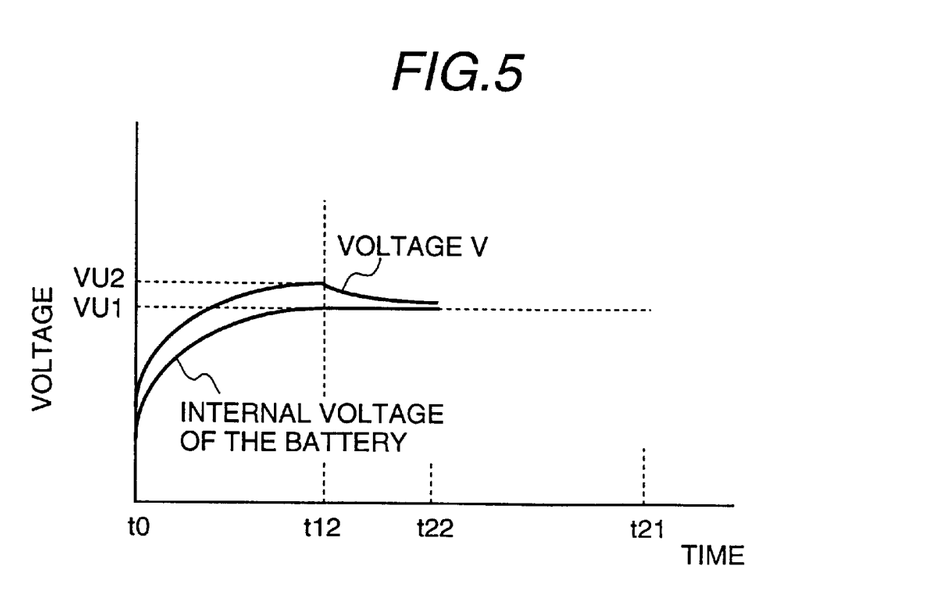
FIG. 5 is a graph indicating the internal voltage during the charging of a secondary battery by the method of the present invention.

When charging of the battery is performed so as to compensate the voltage drop caused by the internal resistance of the battery, which is determined by the method described above the terminal voltage and current of the battery vary as shown in FIG. 4. In FIG. 4, the abscissa indicates time, and the ordinate indicates the voltage and the current. The internal resistance of the battery is measured during the time from t0 to t12. During the time from t0 to t12, the terminal voltage V becomes VU2 at maximum in the range of the charging region by the normal current i0, as shown in FIG. 4. The compensated voltage VU2 is larger than the predetermined internal voltage VU1 by as much as the voltage drop caused by the internal resistance of the battery. The time from t12 to t22 is a period when the battery is charged with a constant normal voltage, and the current is decreased rapidly from the normal current i0. Accordingly, the terminal voltage V also varies as shown in FIG. 4 in accordance with the decrease of the current. Thus, the internal voltage E, which is indicated in the equivalent circuit of the battery, becomes a constant value VU1 during this period. FIG. 5 shows the internal voltage E, which is indicated in the equivalent circuit of the battery. During the charging time t12–t22 with the normal voltage, the voltage is maintained at a constant voltage. The internal voltage E does not exceed the allowable voltage VU1 of the battery even if it becomes maximum, and the safety of the battery is ensured because overcharging of the battery can be avoided.

As explained above, a variation in the concentration gradient of lithium ions at the surface of the electrode in the battery can be decreased by preventing reduction of the current completely to zero by only varying the value of the current. Therefore, the period for stabilizing the voltage when the current is varied becomes short, and the time during which the charging current is varied can be shortened. The charging time can be shortened further, because the charging current is not required to be switched off. In order to determine the internal resistance periodically by varying the current, the charging voltage can be compensated at any time with a newly determined resistance, and a precise charging with high safety can be obtained.

Since both voltage and current are varied during the charging with a constant normal voltage, charging the battery during this period can be performed by adding a compensated voltage by as much as the voltage drop caused by the internal resistance using the latest value of the resistance, which has been determined during the charging with a constant normal current, without measuring the internal resistance during this period.

Figure 6:
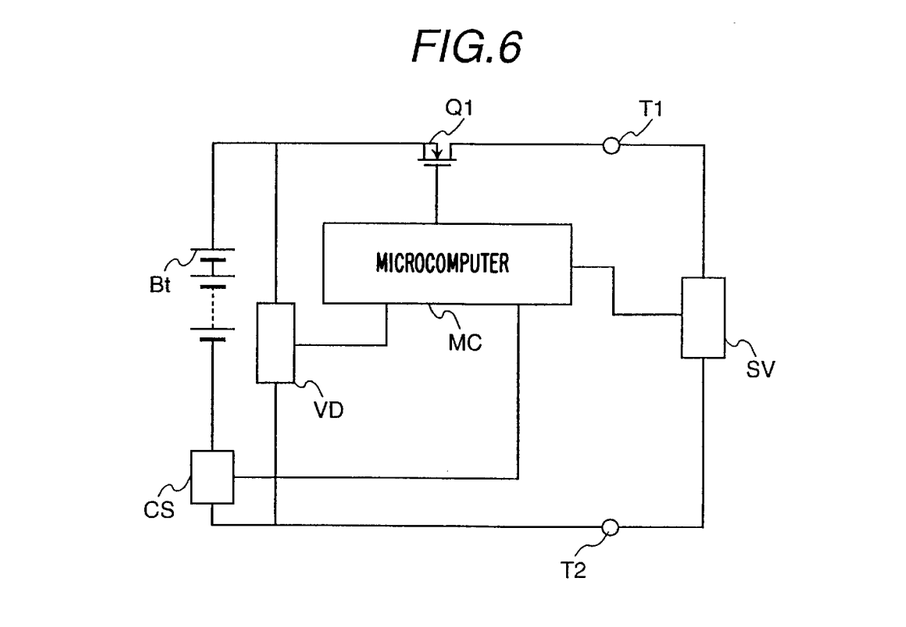
FIG. 6 is a schematic diagram of the charging circuit for a secondary battery according to the present invention.

FIG. 6 shows an example of a charging circuit. A lithium ion secondary battery is indicated by Bt, and a charging control element Q1 and a current sensor CS are connected between a power source SV for charging the battery and the battery Bt. Furthermore, a voltage detector VD is connected in parallel with the battery. A microcomputer MC receives signals from the current sensor Cs and the voltage detector VD and transmits signals to a gate of the charging control element Q1. A control circuit for making the battery voltage equal to a designated value is transmitted to the gate of the charging control element Q1 by the microcomputer so that an output of the voltage detector VD becomes equal to the designated voltage. The output of the current sensor CS is monitored, and the gate of the charging control element is controlled so that the current does not exceed a designated value.

Figure 7:
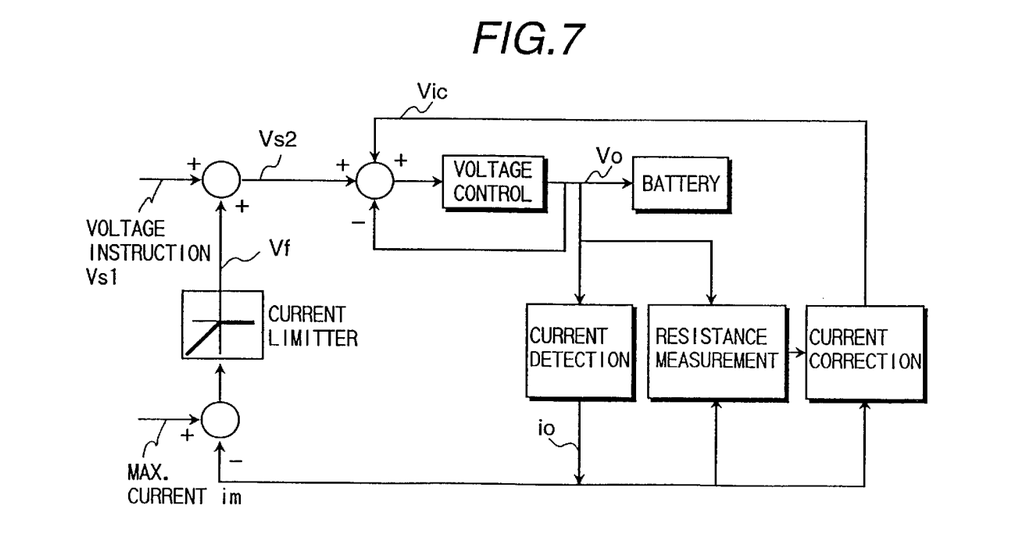
FIG. 7 is a block diagram the charging control circuit for a secondary battery according to the present invention.

FIG. 7 is an illustration indicating details of the circuit operation using function control blocks. The foundation of the control is a voltage control. In consideration of a result of adding the voltage designated value Vs2 to the output voltage value Vo (=the terminal voltage of the battery) without the current correcting feedback value Vic, if Vo is higher than Vs2, the input of the voltage control is decreased to decrease the voltage Vo, i.e. the charging voltage of the battery. If Vo is lower than Vs2, the input of the voltage control is increased to increase the voltage Vo. Next, the function of a current limiter for effecting a constant current operation during charging the battery will be explained. The maximum current im is deducted from the output io from the current defection, the resulting output is passed through the current limiter shown in FIG. 7 and is added to a first designated voltage Vs1 (equivalent to VU1), and the resulting output is designated as a second designated voltage Vs2. In accordance with this functional arrangement, when the current Io is larger than the maximum current im, the limiter output Vf becomes negative, and the limiter output is deducted from the designated value Vs1 so as to decrease the output voltage. When the current io is smaller than the maximum current im, the limiter output Vf becomes zero. And, since the limiter output does not influence the designated value Vs1, the control becomes a constant voltage control.

Next, the resistance measurement and the current correction will be explained. The internal resistance is measured by the method described with reference to FIG. 3(a) and FIG. 3(b) from the voltage and the current before and after varying the maximum current im; a current correction value Vic is calculated as a product of the internal resistance and i0; and the current correction value Vic, the designated voltage Vs2, and the output voltage Vo are summed. As a result, the designated voltage is increased by as much as the correction value Vic, and the output voltage Vo is increased.

Figure 8:
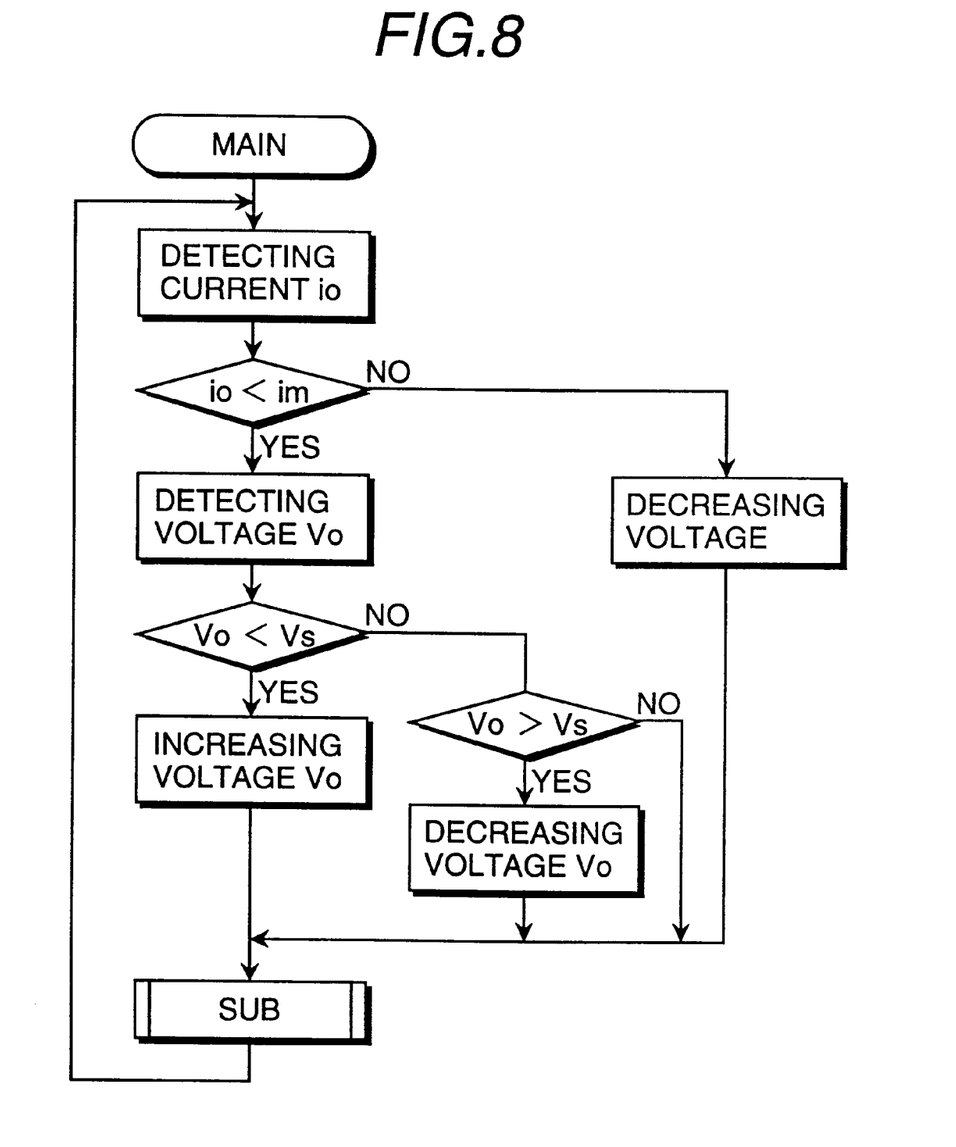
FIG. 8 is a main flow diagram of the charging control process for a secondary battery according to the present invention.
Figure 9:
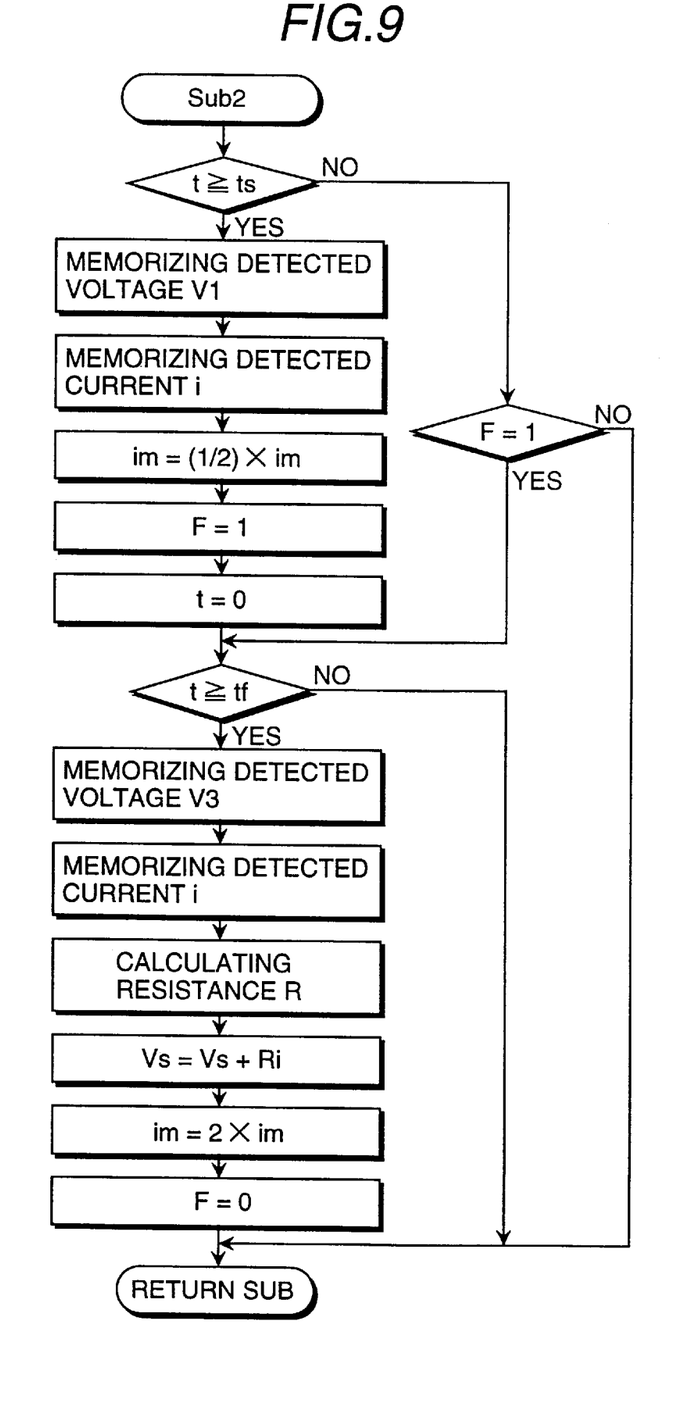
FIG. 9 is a subroutine flow diagram of the charging control process for a secondary battery according to the present invention.

The charging control operation performed by the microcomputer is indicated by the flow charts in FIG. 8 and FIG. 9. The control operation is divided into two parts, i.e. a main routine (FIG. 8) and a subroutine (FIG. 9). In accordance with the main routine, when an instruction for starting the charging operation is received, the current i0 is detected and compared with the maximum designated current im. If the current i0 is smaller than im, the voltage Vo is detected and compared with the designated voltage Vs (=Vs2 +Vic). If the voltage Vo is smaller than Vs, the duty factor of the charging control element Q1 shown in FIG. 6 is increased so as to increase the voltage Vo, and the operation is moved to the subroutine. If the current i0 is larger or equal to the maximum designated current im, the duty factor of the charging control element Q1 is decreased so as to decrease the voltage Vo, and the operation is moved to the subroutine. The voltage Vo is compared with the designated value Vs. If the voltage Vo is larger than the designated value Vs, the duty factor of the charging control element Q1 shown in FIG. 6 is decreased so as to decrease the voltage Vo, and the operation is moved to the subroutine. If the voltage Vo is equal to the designated value Vs, the operation is moved to the subroutine without any change.

The subroutine will be explained with reference to FIG. 9. First, it is determined whether the time t becomes a time ts for measuring the resistance. If it becomes ts, the terminal voltage and the current are determined, the maximum designated current im is divided into ½ im, and flag F is made 1 and the time is made zero before proceeding to the next step. It is determined whether the time t becomes a short time tf for measuring the resistance. If the time does not reach the short time tf for measuring the resistance, the subroutine is passed through without doing any operation. If the time does not reach the time ts for measuring the resistance, it is determined whether the flag F is one or not. If the flag F is one, the operation is moved to the step for determining whether the time reaches the short time tf for measuring the resistance or not. If the flag F is not one, the subroutine is passed through.

If the time t reaches the short time tf for measuring the resistance, the voltage V3 and the current i are detected, and values thereof are stored in a memory. Then, the resistance R is calculated and the value thereof is stored in a memory, a new designated voltage Vs is calculated and output, the maximum designated current im is duplicated, the flag is made zero, and the subroutine is passed through. The charging control can be carried out as explained above.

The present invention can be clearly applied to various secondary batteries in addition to a lithium battery, and to a battery having an equivalent circuit other then the equivalent circuit shown in FIG. 2.

In accordance with the present invention, the charging current is not switched off completely. Accordingly, the time for stabilizing the voltage when the current is varied requires a short time, and the time for varying the charging current can be decreased.

The charging time can be decreased by compensating the designated voltage by adding an extra voltage by as much as the voltage drop caused by the internal resistance of the battery. The charging time can be decreased further, because the charging current is not switched off.

What is claimed is:

1. A method of charging a secondary battery, comprising the steps of:

varying the values of a charging current to a different current value from a normal current value at which the secondary battery is being charged with a constant current;

measuring an internal resistance of the battery based on the current flowing in the secondary battery and a terminal voltage of the secondary battery; and charging the secondary battery so as to make the terminal voltage approximately equal to a value which is determined as a sum of a voltage equivalent to the voltage drop caused by the internal resistance of the battery and a predetermined internal voltage of the battery.

2. A method of charging a secondary battery as claimed in claim 1, wherein:

said internal resistance of the secondary battery is calculated by dividing a variation of the terminal voltage of the secondary battery with a variation of the charging current of the secondary battery.

3. A method of charging a secondary battery as claimed in claim 1, wherein:

the charging current is returned to the current value at which the secondary battery was being charged with a constant current after measuring the internal resistance of the secondary battery.

4. A method of charging a secondary battery as claimed in claim 1, wherein:

the charging current flow is maintained, but the value thereof is decreased so as to be smaller than the current value used for charging the secondary battery with a constant current.

5. A method of charging a secondary battery as claimed in claim 4, wherein:

the time from starting the charging current to flow, when charging the secondary battery with a constant current, to the time when the charging current is decreased is at least one minute.

6. A method of charging a secondary battery as claimed in claim 5, wherein:

the time from starting the charging current to flow, when charging the secondary battery with a constant current, to the time the charging current is decreased is equal to or less than 30 minutes.

7. A method of charging a secondary battery as claimed in claim 5, wherein:

the time from starting the charging current to flow, when charging the secondary battery with a constant current, to the time when the charging current is decreased is equal to or less than 10 minutes.

8. A method of charging a secondary battery as claimed in claim 4, wherein:

the duration when the charging current is decreased is at least 10 milliseconds.

9. A method of charging a secondary battery as claimed in claim 8, wherein:

the duration when the charging current is decreased is equal to or less than one minute.

10. A method of charging a secondary battery as claimed in claim 4, wherein:

the charging current is decreased to a current value which is equal to or more than 0.5 times that of the current value when charging the secondary battery with a constant current.

11. A method for charging a secondary battery as claimed in claim 10, wherein:

the duration when the charging current is decreased is equal to or less than one minute.

12. A method of charging a secondary battery as claimed in claim 1, wherein:

the charging current is increased to a current value which is larger than the current value when charging the secondary battery with a constant current.

13. A method of charging a secondary battery as claimed in claim 12, wherein:

the charging current is increased to a current value equal to or less than 1.5 times the current value when charging the secondary battery with a constant current, and the duration when the charging current increased is at least 10 milliminutes and is equal to or less than one minute.

* * * * *